ELECTRICAL CONNECTING APPARATUS

Filed April 1, 1960

INVENTORS
HERBERT ROSENTHAL
JACK WEISBERG
BY Albert F. Kronman
ATTORNEY

United States Patent Office 3,105,729

Patented Oct. 1, 1963

3,105,729
ELECTRICAL CONNECTING APPARATUS

Herbert Rosenthal and Jack Weisberg, both of 1085 McKinley St., Baldwin, N.Y.

Filed Apr. 1, 1960, Ser. No. 19,306
6 Claims. (Cl. 339—18)

This invention relates to a connecting means which can be used with panels having printed circuits formed on their surface or surfaces. It has particular reference to small conductive spheres which can be inserted into apertures in circuit panel boards and make conductive contact with circuit components and conductors.

Printed circuits have been used in many circuit applications, especially in the electronic field. They have many advantages over the older type of circuit employing separate insulated conductors which are soldered to binding posts. One of the disadvantages of the printed type of circuit has always been the difficulty in attaching conductors from circuit components such as resistors, capacitors, and inductors. The present invention eliminates this difficulty and provides a quick, easy way of making such connections without soldering. Another disadvantage of the printed circuit is the difficulty in making connections between conductors placed on opposite sides of an insulating panel. Rivets and grommets have been tried but they are generally the source of noise and generate resistance unless soldered to both sides. The present invention eliminates this difficulty without soldering because the conductive components are held in resilient contact by the panel material itself and the connected components are situated within the body of the panel and are therefore not subject to the usual hazard of contact with external articles. Also, the tendency to oxidation is almost entirely eliminated.

An object of the present invention is to provide an improved connecting means for printed circuits which avoids one or more of the disadvantages and limitations of prior art arrangements.

Another object of the present invention is to eliminate soldering of conductors which are connected to circuit components.

A further object of the present invention is to reduce the cost of printed circuits by providing an easy, quick, and reliable method of making connections.

Still another object of the present invention is to facilitate connections between opposite sides of a single panel having printed conductors on both sides.

Another object of the present invention is to join two or more panels, each having printed circuits, by providing circuit connections between conductors on any or all of the panel surfaces.

The invention consists of the construction, combination and arrangement of parts, as herein illustrated, described and claimed.

The invention includes a connecting means for joining circuit components and conductors on printed circuit panels. A deformable insulating panel is used with circuit conductors, separate or secured to the panel surface. The panel is preformed with apertures which are positioned adjoining the conductors which are to be connected and these apertures are formed with concave sides or with annular ribs for resiliently holding a conductive sphere which is inserted into the aperture together with the ends of at least two of the conductors to be joined.

In the accompanying drawings, forming a part hereof are illustrated several forms of embodiment of the invention, in which drawings similar reference characters designate corresponding parts and in which.

Figure 1:
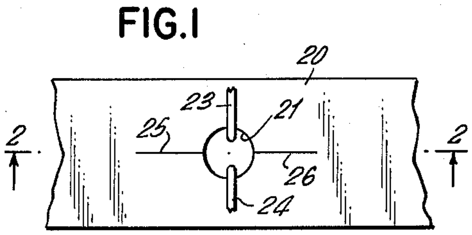
FIGURE 1 is a plan view of a portion of a printed circuit panel with two conductors.
Figure 2:
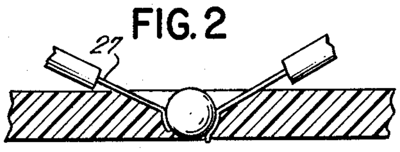
FIGURE 2 is a cross sectional view taken along line 2—2 of FIGURE 1 with the addition of two conductors connected to circuit components.
Figure 5:
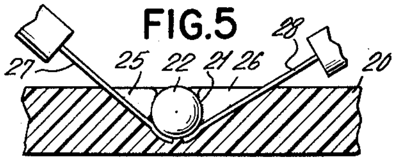
FIGURE 5 is a view similar to FIGURE 2 but showing an aperture open only on one side.

Referring now to FIGURES 1, 2, and 5, a deformable panel 20 is formed with an aperture 21 for receiving a conductive sphere 22. The aperture 21 is molded with concave sides having generally the contour of a sphere but small enough to grip the sphere 22 tightly when it is inserted. Conductors 23, 24, are bent over as the sphere is inserted to make positive contact between these components. Two slits 25, 26, are precut in the panel to facilitate the entrance of the sphere and for insertion of wire conductors 27, 28, as indicated in FIGURES 2 and 5.

Figure 3:
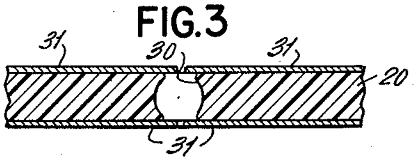
FIGURE 3 is a cross-sectional view of a panel having an aperture adjoining four conductors, two on each side of the panel.
Figure 4:
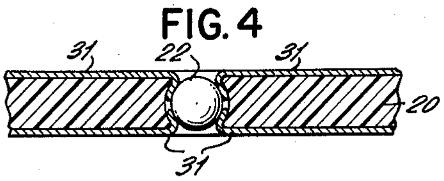
FIGURE 4 is a view similar to FIGURE 3 but showing the ends of the conductors bent into the aperture and a conductive sphere in resilient contact with all four conductors.

The connector arrangement shown in FIGURES 3 and 4, is first formed as a plastic panel 20 with a cavity or aperture 30. Then the conductive strips 31 are added by any of the well known methods used in preparing printed panels. In order to produce an overhang of the edge of the aperture, it may be filled with wax prior to a plating operation. After the wax is removed, the ends of the conductive strips are bent over into the aperture. When the sphere 22 is pushed into the aperture a conductive connection is established between the upper and lower conductors.

Figure 6:
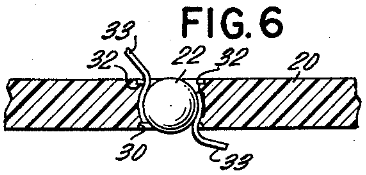
FIGURE 6 is a cross-sectional view showing a deformable panel with an aperture containing two annular beads or projections for resiliently holding a conductive sphere.

FIGURE 6 is similar to the other forms shown but the aperture 30 is formed with two annular ridges or beads 32 extending from the inner surface of a cylindrical hole. This figure shows two wires 33 wedged between the conductive sphere and the deformable plastic. Many more wires can be connected to this same "terminal." The wires are first placed in the hole, then the sphere is pressed into the hole in the position shown.

Figure 7:
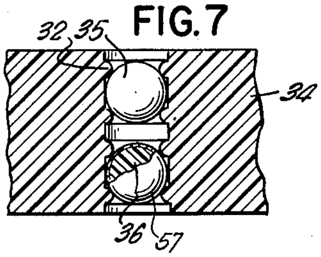
FIGURE 7 is a view similar to FIGURE 6 but showing an aperture with four annular projections capable of holding two conductive spheres which may be used to connect a number of conductors from each side of the panel.

FIGURE 7 is similar to FIGURE 6 except that a thicker plastic panel 34 is employed and two spheres 35, 36 are pushed into the same hole. Four annular beads 32 position the sphere which may be used as two "terminals" at different potentials.

Figure 8:
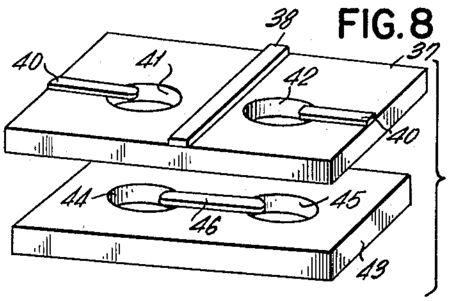
FIGURE 8 is a diametric view of two panels, each with a secured conductor, illustrating how a cross-over may be made with two conductors.
Figure 9:
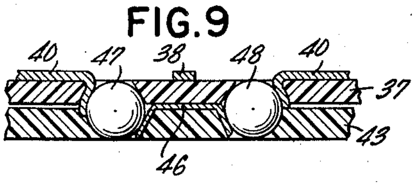
FIGURE 9 is a cross-sectional view of the two panels shown in FIGURE 8, joined together with two conductive spheres to produce a cross-over.

FIGURES 8 and 9 show the combination of two panels to create a cross-over of two conductors. The top panel 37 includes the two conductors 38, 40, but one of the conductors is separated at the cross-over position and two holes 41, 42, are formed adjoining the conductor ends. The second panel 43 is formed with similar holes 44, 45, which match the holes in the upper panel and a short conductor 46 is secured to the bottom panel with the conductor ends extending over the hole edges. The conductor ends are bent over and then the two panels are assembled as shown in FIGURE 9 with two spheres 47, 48, making contact between the four ends.

Figure 10:
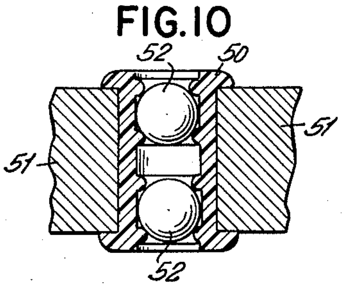
FIGURE 10 is a cross-sectional view of a metallic conductive panel having a single hole filled with a grommet containing two conductive spheres.

The terminal shown in FIGURE 10 is similar to the terminal or connector of FIGURE 7 except the deformable plastic is formed as a grommet 50 and is used with a metallic conductive panel 51. The grommet is inserted in the hole in the panel before the spheres 52 are added. Then the wires (not shown) are inserted and the spheres pushed into place. This type of connector is quite stable because it is supported by a stiff metal panel and because the spheres retain it in its desired position after all connections have been completed.

It will be apparent that instead of a deformable panel and a rigid sphere the structure of FIGURES 1–9, may consist of a rigid panel and a deformable sphere. The spheres 22 may be either of conductive material or non-conductive material. Alternately, they may be made of non-conductive material such as ceramic and plated with a conductive coating of metal. It is also within the purview of the present invention to change the shape of the spheres 22 from that illustrated to non-circular shapes which are adapted to be received within an undercut cavity in a panel. The spheres 22, 35, 36, may also be formed of some resilient plastic material such as neoprene or the like having a conductive coating 57 on the outside thereof as shown in FIGURE 7.

In addition to using the sphere as a conductor or anchoring medium, the sphere itself may comprise an electrical component such as a semi-conductor, resistor, or the like. The spheres may also contain neon or argon and function as lights within the circuit into which they are incorporated.

In the embodiment shown in FIGURE 9, it is within the purview of the present invention to have the upper portion 37 of the board made of flexible material and the lower portion 43 of a rigid material. In this form the spheres 47, 48, could be inserted on the flexible side of the assembly.

Figure 11:
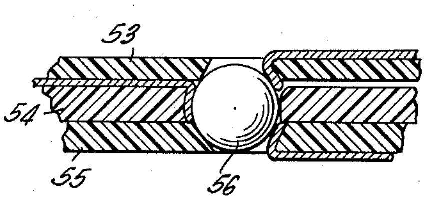
FIGURE 11 is a cross-sectional view of three panels assembled with three conductors, connected by a single conductive sphere.

In the embodiment illustrated in FIGURE 11, there is shown a composite panel board made up of three panels, 53, 54 and 55. While the central panel 54 has been illustrated as being of a size greater than that of panels 53 and 55, it is to be understood that the central panel in this embodiment may be of extremely thin materials, such as plastics, or paper upon which the conductive material has been printed or otherwise impressed.

The connector shown in FIGURE 11 shows three panels 53, 54, and 55, all assembled in parallel relationship and all secured to each other. Each panel supports a conductor, the end of which is bent over into the aperture. A single sphere 56 connects all the conductors. In such an arrangement, the holes in the top and bottom panels, 53 and 55 are made smaller than the hole in the middle panel 54 and the sides are sloping as indicated in the drawing. Such a design retains the conductive sphere permanently in its desired position as long as the three panels retain their position.

It will be evident from the foregoing descriptions that the combination of a conducting sphere in a deformable plastic aperture creates an electrical connecting means having many desirable features such as wide application to a large varity of electrical connections. In addition, the spheres lend themselves to fully automatic insertion such as is required in automatic assembly lines. The spheres can be picked up by magnetized plungers and inserted to make the desired connections. If it is desired to remove an electrical component from the assemblies herein described, it is merely necessary to push the sphere out of its socket, whereupon the components will fall free.

Having thus fully described the invention what is claimed as new and desired to be secured by Letters Patent of the United States is:

1. An electrical connecting means for joining circuit components and conductors comprising, a panel of deformable insulating material including electrical circuit conductors disposed in the planes of the panel secured thereto, said panel formed with apertures adjoining some of said conductors, and a conductive sphere for said apertures adapted to be held therein and make conductive connection between at least two of said conductors.

2. An electrical connecting means for joining circuit components and conductors comprising, a panel of deformable insulating material including electrical circuit conductors disposed in the planes of the panel associated therewith, said panel formed with apertures adjoining some of said conductors, and a conductive sphere for said apertures adapted to be held therein and make resilient engagement with the sides of the aperture and parts of at least two of said conductors.

3. A connecting means as set forth in claim 2 wherein said apertures are formed with concave sides for resilient retention of the sphere.

4. A connecting means as set forth in claim 2 wherein said aperture sides include annular extensions adapted to hold the conductive spheres in resilient engagement.

5. A connecting means as set forth in claim 2 wherein radial slits are cut in the panel to accommodate conductors connected to components not secured to said panel.

6. An electrical connecting means for joining circuit components and conductors associated with circuit panels comprising, a panel of deformable insulating material having at least one aperture for holding a conductive sphere and retaining it in resilient contact, at least two conductors secured to the surface of said panel and disposed in the planes of the panel and including conductive extensions initially positioned over the edge of said apertures, said sphere adapted to make contact within the aperture with bent-over ends of said conductive extensions for the transmission of electrical energy.

References Cited in the file of this patent

UNITED STATES PATENTS

| | | |
|---|---|---|
| 1,771,805 | Miller | July 29, 1930 |
| 1,858,196 | Wermine | May 10, 1932 |
| 2,437,018 | Dodson | Mar. 2, 1948 |
| 2,695,379 | Myers et al. | Nov. 23, 1954 |

FOREIGN PATENTS

| | | |
|---|---|---|
| 674,530 | Great Britain | June 25, 1952 |

OTHER REFERENCES

Products Engineering, December 21, 1959, page 73. (Copy in Sci. Lib.)